No. 669,937. Patented Mar. 12, 1901.
W. W. ENDICOTT.
WAGON RIM ADJUSTER.
(Application filed Aug. 6, 1900.)
(No Model.)
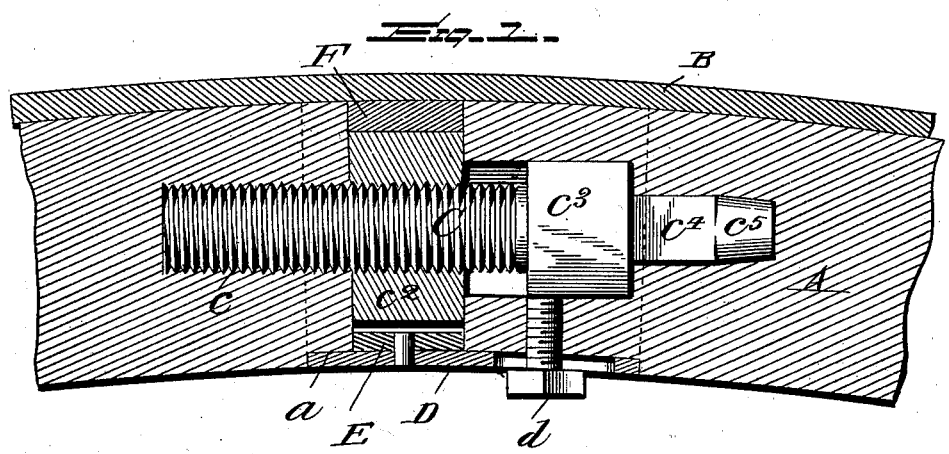
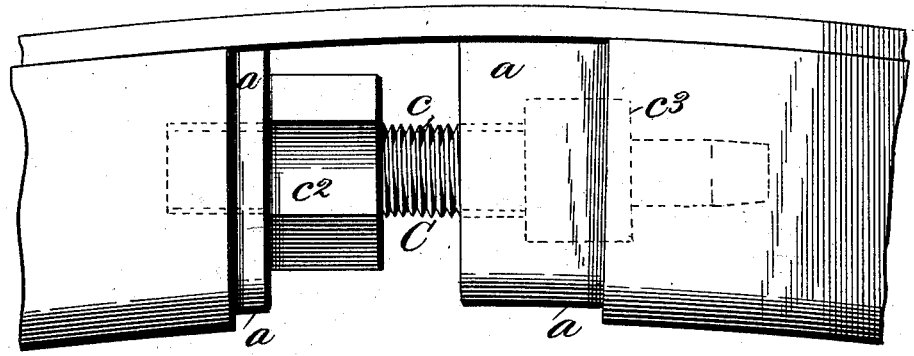
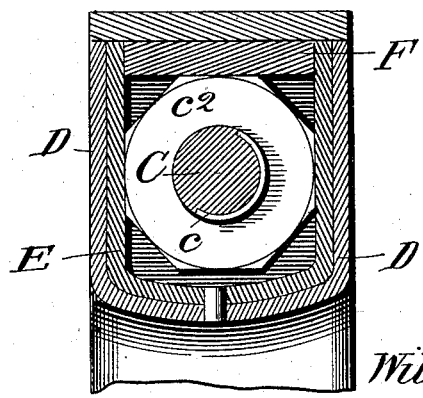
WITNESSES:
L. C. Hills
R. M. Elliott
INVENTOR:
William W. Endicott,
by his attorney.

UNITED STATES PATENT OFFICE.

WILLIAM W. ENDICOTT, OF MYRTLEPOINT, OREGON, ASSIGNOR OF ONE-HALF TO SCHILLER B. HERMANN, OF SAME PLACE.

WAGON-RIM ADJUSTER.

SPECIFICATION forming part of Letters Patent No. 669,937, dated March 12, 1901.

Application filed August 6, 1900. Serial No. 26,085. (No model.)

*To all whom it may concern:*

Be it known that I, WILLIAM W. ENDICOTT, a citizen of the United States, residing at Myrtlepoint, in the county of Coos and State of Oregon, have invented certain new and useful Improvements in Wagon-Rim Adjusters; and I do hereby declare the following to be a full, clear, and exact description of the invention, such as will enable others skilled in the art to which it appertains to make and use the same.

This invention relates to felly-adjusters.

The object is in a simple, efficient, and practical manner to obviate injury to a wooden wheel, as from dishing in wet weather, resulting from the expansion of the felly, spokes, and hub, or in dry weather from looseness of the felly with relation to the spokes and of the spokes with relation to the hub.
With this object in view the invention consists generally in the provision of means for adjusting the felly to meet the requirements of the weather, whether wet or dry—that is to say, to effect shortening of the felly in wet weather and lengthening of the same in hot weather—thus to overcome any tendency to injury of a wheel under all conditions of use.

In the accompanying drawings, forming a part of this specification, and in which like letters of reference indicate corresponding parts, I have exhibited a form of embodiment of my invention, it being understood that the same may be carried into effect in other ways without departing from the spirit of the same.
In the drawings, Figure 1 is a view in sectional elevation exhibiting my device as applied to two sections of a felly. Fig. 2 is a similar view exhibiting the adjusting mechanism in full lines, the sections of the felly being separated from the adjusting mechanism; and Fig. 3 is a view in transverse section taken on the line 3 3, Fig. 1.

Referring to the drawings, A designates the felly, which may be of any ordinary construction and assembled with relation to the spokes in any desired manner, and B the tire.

The device of my invention may be applied to as many sections of a felly as may be desired—that is to say, in light wagons it may be applied to two sections of the felly and in heavy wagons, such as drays or the like, it may be applied to each section of the felly. For convenience of illustration it is here shown as applied to but two sections of the felly.

The device consists, essentially, of a bolt C, one portion of which is threaded, as at $c$, the threaded portion carrying a nut $c^2$ and the other portion carrying a shoulder $c^3$, preferably square and integral with the bolt proper, an extension $c^4$, and a projection $c^5$, preferably circular in cross-section. The opposing ends of the felly are incut or reduced in cross-section, as at $a$, and fitting on the opposing sections of the felly and lying flush with the sides thereof is a felly-section D, consisting of a section of iron or other suitable material bent to a shape corresponding in cross-section to that of the felly and being of the same size thereof, and secured within the felly-section D is a yoke E, constituting a nut-lock, the yoke to be suitably riveted to the felly-section, as shown in Fig. 3. The under side of the felly-section is provided with a slot, through which passes a bolt $d$ to screw into the felly whereby to keep the latter at the proper adjustment. One end of the felly is bored out to accommodate the threaded end of the bolt C, and the other section of the felly is provided with a chamber to accommodate the shoulder $c^3$, the extension $c^4$, and the projection $c^5$.

In operation the opposing ends of the sections of the felly, whether they be two or more, are cut away to permit adjustment should the felly expand or contract. In the event of expansion of the felly, as from moisture, the binding-bolt $d$ will be loosened, thereby permitting removal of the felly-section D. The bolt $c^2$ is then turned back upon the bolt C, thus to shorten the circumference of the felly and by this procedure to remove strain from the spokes, which would tend to cause dishing of the same, the shoulder $c^3$ operating to prevent any turning of the bolt while the nut $c^2$ is being operated. The felly-section D is then placed in the position shown in Fig. 3 and the bolt $d$ is secured in place, thereby holding the parts in operative position. Where the felly shrinks, as in very dry weather, the same operation as to the removal of the felly-section is observed, with the exception that the nut $c^2$ is turned upon the bolt C in such manner as to force the sections of the felly apart, thus to take up any space that may exist between the same, and thereby to place the sections of the felly under the proper strain or stress securely to hold the tire in place.

In order that the tire may have a solid seating around the felly and bridging the space between the sections of the felly to which my device is applied, I may employ a filling-block F, which will rest upon one of the faces of the adjusting-nut $c^2$ and also bear against the tire, so that a solid bearing for the tire at these points will be presented.

Having thus fully described my invention, what I claim as new, and desire to secure by Letters Patent of the United States, is—

1. The combination with the opposing ends of two sections of a felly, of adjusting mechanism, comprising a bolt held against rotary motion with regard to one member of the felly, a nut adapted, upon being turned, either to take up any looseness, or to provide for expansion of the felly, and means, constituting a nut-lock, for holding the nut in its adjusted position, substantially as described.

2. The combination with the opposing ends of two sections of a felly, of adjusting mechanism, comprising a bolt held against rotary motion with regard to one member of the felly, a nut adapted, upon being turned, either to take up any looseness, or to provide for expansion of the felly, a detachable felly-section provided with means for holding the nut in its adjusted position, and a binding-bolt carried by the section for locking the same in its adjusted position, substantially as described.

3. The combination with the opposing ends of two sections of a felly, of adjusting mechanism, comprising a bolt held against rotary motion with regard to one member of the felly, a nut adapted, upon being turned, either to take up any looseness, or to provide for expansion of the felly, a detachable felly-section provided with means for holding the nut in its adjusted position, a binding-bolt carried by the section for locking the same in its adjusted position, and a filling-block interposed between the opposing faces of the felly-sections, substantially as described.

In testimony whereof I affix my signature in the presence of two subscribing witnesses.

WILLIAM W. ENDICOTT.

Witnesses:
GEO. H. GUERIN,
NICOLAS G. W. PERKINS.